United States Patent [19]
Webb et al.

[11] Patent Number: 5,933,254
[45] Date of Patent: Aug. 3, 1999

[54] METHOD AND APPARATUS FOR GENERATING A DIGITAL REPRESENTATION OF AN IMAGE

[75] Inventors: Graham Webb, New Barnet; Martin Philip Gouch, Hemel Hempstead, both of United Kingdom

[73] Assignee: Fujifilm Electronic Imaging Ltd., London, United Kingdom

[21] Appl. No.: 08/885,963

[22] Filed: Jun. 30, 1997

[30] Foreign Application Priority Data

Jul. 2, 1996 [GB] United Kingdom .................. 9613865

[51] Int. Cl.$^6$ ...................................... H04N 1/46
[52] U.S. Cl. .......................... 358/500; 358/522; 358/523; 358/532
[58] Field of Search .................... 358/530, 500, 358/501, 522, 523, 524, 538, 532; 382/266, 267

[56] References Cited

U.S. PATENT DOCUMENTS 5,357,353  10/1994  Hirota ....................................... 358/530
5,696,850  12/1997  Parulski et al. .......................... 382/261

FOREIGN PATENT DOCUMENTS

| 405470A2 | 1/1991  | European Pat. Off. . |
| 565283A1 | 10/1993 | European Pat. Off. . |
| 648042A1 | 4/1995  | European Pat. Off. . |
| 653879A2 | 5/1995  | European Pat. Off. . |
| 706285A2 | 4/1996  | European Pat. Off. . |
| 7203175  | 8/1995  | Japan . |
| 7285241  | 10/1995 | Japan . |

*Primary Examiner*—Jerome Grant, II
*Attorney, Agent, or Firm*—Sughrue, Mion, Zinn Macpeak & Seas, PLLC

[57] ABSTRACT

A method and apparatus for generating a digital representation of an image. The apparatus includes a scanning device for scanning the image to generate digital data defining the colour content of pixels of the image. An input profile generator is provided for generating an input profile defining the NTF of the scanning device.

21 Claims, 7 Drawing Sheets

Fig. 1.

Fig.2. TRANSPARENCY MTF

METHOD AND APPARATUS FOR GENERATING A DIGITAL REPRESENTATION OF AN IMAGE

FIELD OF THE INVENTION

The invention relates to methods and apparatus for generating a digital representation of an image.

DESCRIPTION OF THE PRIOR ART

Conventional, digital representations of images are defined by arrays of digital data defining the colour content of the image. By digitising images, it is possible to carry out various colour modifications on the image using computer techniques as well as being able to change the size of the image and locate it within a page containing other images or text. Such systems are very well known and examples are manufactured by companies such as Crosfield Electronics Limited, Linotype-Hell and Scitex. Real images not only contain colour information but also spatial, frequency information representing the manner in which colours change through the image. Devices used to input scan images for digitisation, for subsequent processing, and for output scanning all have respective modulation transfer functions (MTFs) representing combined frequency response and phase response which can degrade the true frequency profile within an original image and hence reduce sharpness appearance. In order to overcome this problem, it has been conventional in the past to apply a sharpening function to the digitised image, typically using a process known as unsharp masking (USM). Because USM is processing intensive and dependent to some extent on the characteristics of the input scanner, it is often implemented as part of the scanner function. In EP-A-0171954, however, we describe a system in which USM is carried out in parallel with colour processing in order to reduce noise.

Until now, manufacturers have developed proprietary devices for input and output scanning and image editing and these have had built into them the necessary algorithms to enable sharpness to be correctly tailored to the particular devices involved. Some software such as Photoshop manufactured by Adobe can add sharpening but this will be carried out in a non-optimum manner as it is not related to the characteristics of the original image as modified by an input scanner. There is a need to be able to connect together devices from different manufacturers. For example, an input scanner from one manufacturer may be connected to an output scanner of a second manufacturer. In these situations, the user must assess sharpness degradation by reviewing visual sharpness which is a subjective approach requiring suitable expertise.

SUMMARY OF THE INVENTION

In accordance with one aspect of the present invention, a method of generating a digital representation of an image comprises scanning the image to generate digital data defining the colour content of pixels of the image; and generating an input profile defining the MTF of the scanning process.

In accordance with a second aspect of the present invention, image digitisation apparatus comprises a scanning device for scanning the image to generate digital data defining the colour content of pixels of the image; and means for generating an input profile defining the MTF of the scanning device.

We have realised that it is possible to characterise the MTF of the various processes and devices used in an image processing environment so that "profiles" can be defined which represent the MTF of a process and this information can then be used during subsequent processing and/or output to compensate for changes in sharpness introduced by the process or processor concerned.

In this specification, the MTF is defined as the modulus of the phase and quadrature (real and imaginary) parts of the frequency response of a process. The full definition of frequency response of an image is a complex multidimensional function but it may be simplified for the purposes of this invention. We have found that MTF, which is the modulus of phase and quadrature components is adequate. We have also found that two orthogonal directions, i.e. elliptical symmetry, provide adequate definition of response. The MTF can, therefore, be defined as two data lists against a scale of cycles per pixel pair. The use of cycles per pixel pair allows us to scale the data for enlargement purposes without affecting the MTF data.

The advantage of the invention is that it allows an "open" system to be developed in which the user is presented with a digitised representation of the image and a profile and he does not need to understand the precise process involved in arriving at that stage. Providing the profiles are defined in a universal manner for use by devices manufactured by any manufacturer, different devices from different manufacturers can then be combined together.

During subsequent processing, the input profile can either be modified or stored for combination with other editing profiles, to enable the effect on frequency of later processing to be compensated, prior to outputting the image by an output device. At the outputting stage, the digital representation of the image can then be modified by each of the profiles individually or the profiles could be combined, for example, concatenated, the resultant profile then being used to modify the digital data. In a further alternative, the digital data itself could be modified by each profile at each stage.

Typically, the user will wish to edit the image and thus a method of editing a digital representation of an image defined by digital data defining the colour content of pixels of the image and an input profile generated in accordance with the invention comprises generating an editing profile which, when applied to the digital representation of the image in combination with the input profile, will impart a desired sharpening to the image. Typically, this modification is unsharp masking (USM) but other sharpening techniques could be used.

Preferably, the editing profile is determined also to take account of an output profile representing the frequency response of an output process in which the image is output onto a record medium. The record medium will typically be film or plate material but could include a digital store or display.

As will be described in more detail below, in this aspect, the user will define a desired degree of sharpness which will then be incorporated into an algorithm which takes account of the various profiles involved in the reproduction process as well as the desired degree of sharpness and generates a sharpness profile which will result in the output image having the desired degree of USM.

During an editing process, the user will usually wish to view the effect of an editing process on a monitor or the like. Typically, therefore, the viewing step comprises generating and displaying a resized version of the image, after modification by the input profile and editing profile, by applying a view profile, the view profile compensating for the MTF due to the resizing process and for the MTF of the editing output device.

Conveniently, the view profile is obtained by combining a resizing profile representing the MTF of the resizing process, and an editing output device profile representing the MTF of the editing output device.

BRIEF DESCRIPTION OF THE DRAWINGS

An example of a method and apparatus according to the invention will now be described with reference to the accompanying drawings, in which.

DETAILED DESCRIPTION OF THE EMBODIMENTS

Figure 1:
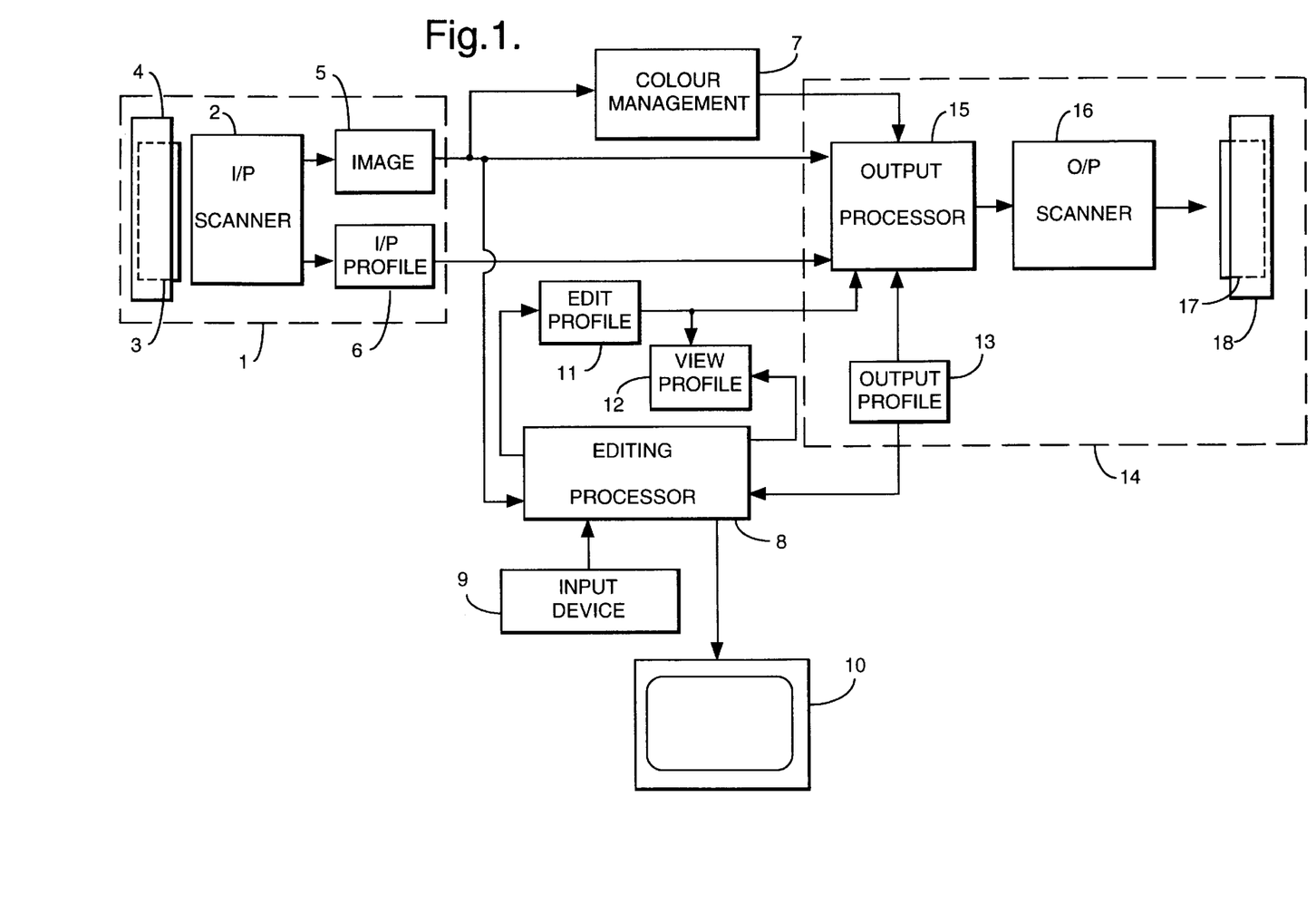
FIG. 1 is a schematic block diagram illustrating the apparatus.

The apparatus includes an input device 1 which comprises an input scanner 2 which scans an image contained on a transparency 3 mounted to a rotating drum 4. Of course, the invention is applicable to any type of scanner including flat bed CCD scanners. The input scanner 2 generates digital data defining the colour component content of individual pixels of the image on the transparency 3 (in a conventional manner) and this digital data is stored in an image store 5. In addition, the scanner 2 generates an input profile which is stored in a store 6 and represents the MTF of the overall input process.

The input profile is effectively the combination of three profiles, one representing the MTF of the origination process which produced the image on the transparency 3, the second representing the MTF due to the scanner lens, and the third due to the MTF of the scanner aperture. In the case of a CCD scanner, there is no physical aperture but a sample area determined by the optics of each individual element of the array.

The origination will have an MTF characteristic. For instance, a transparency which is a photographic reproduction will be limited because of the film grain size and because of the camera lens. A drawing or painting will be limited by the paper and brush or pencil used for the drawing.

Figure 2:
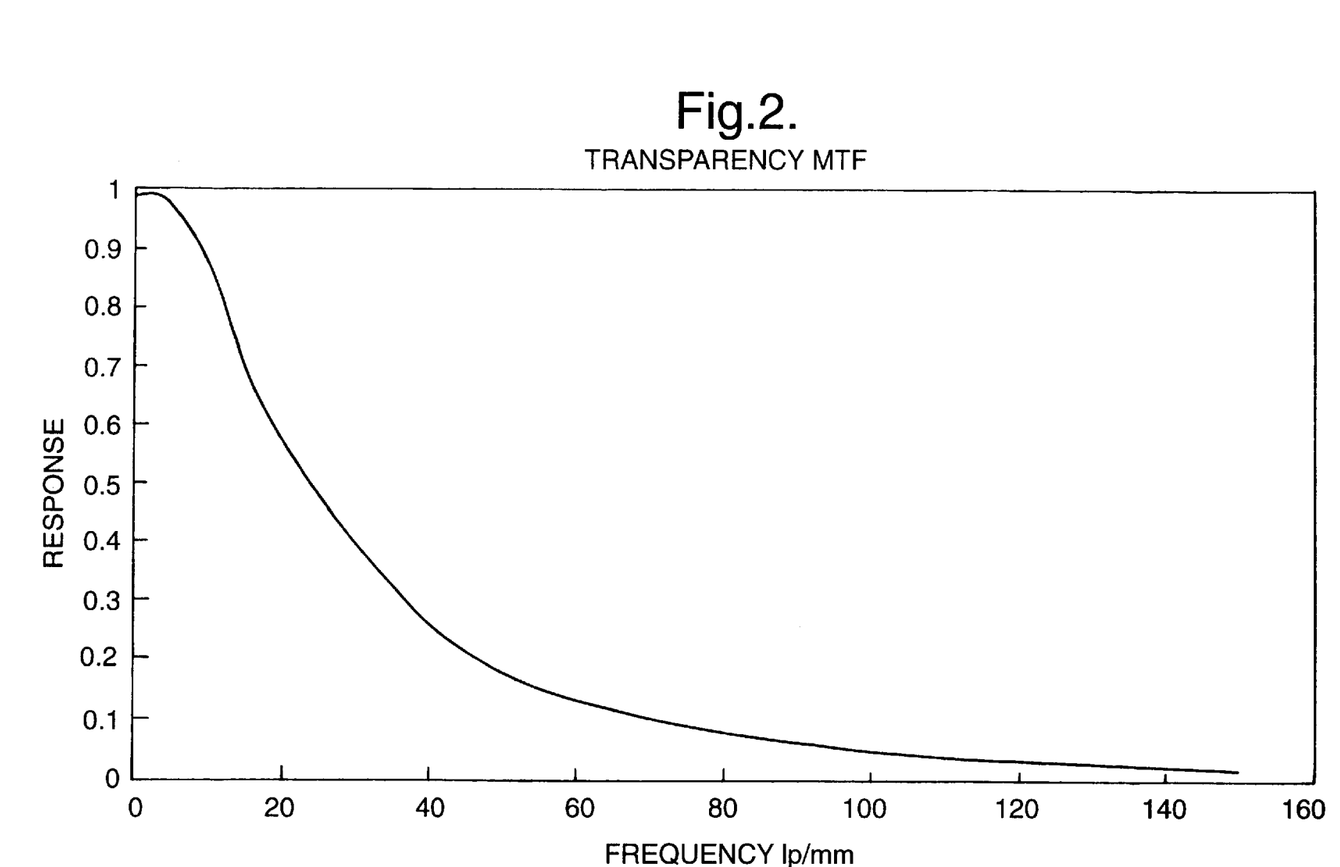
FIG. 2 illustrates a typical transparency MTF.

FIG. 2 illustrates a typical MTF for an origination process where it will be seen that the MTF decreases as the line frequency increases.

Figure 3:
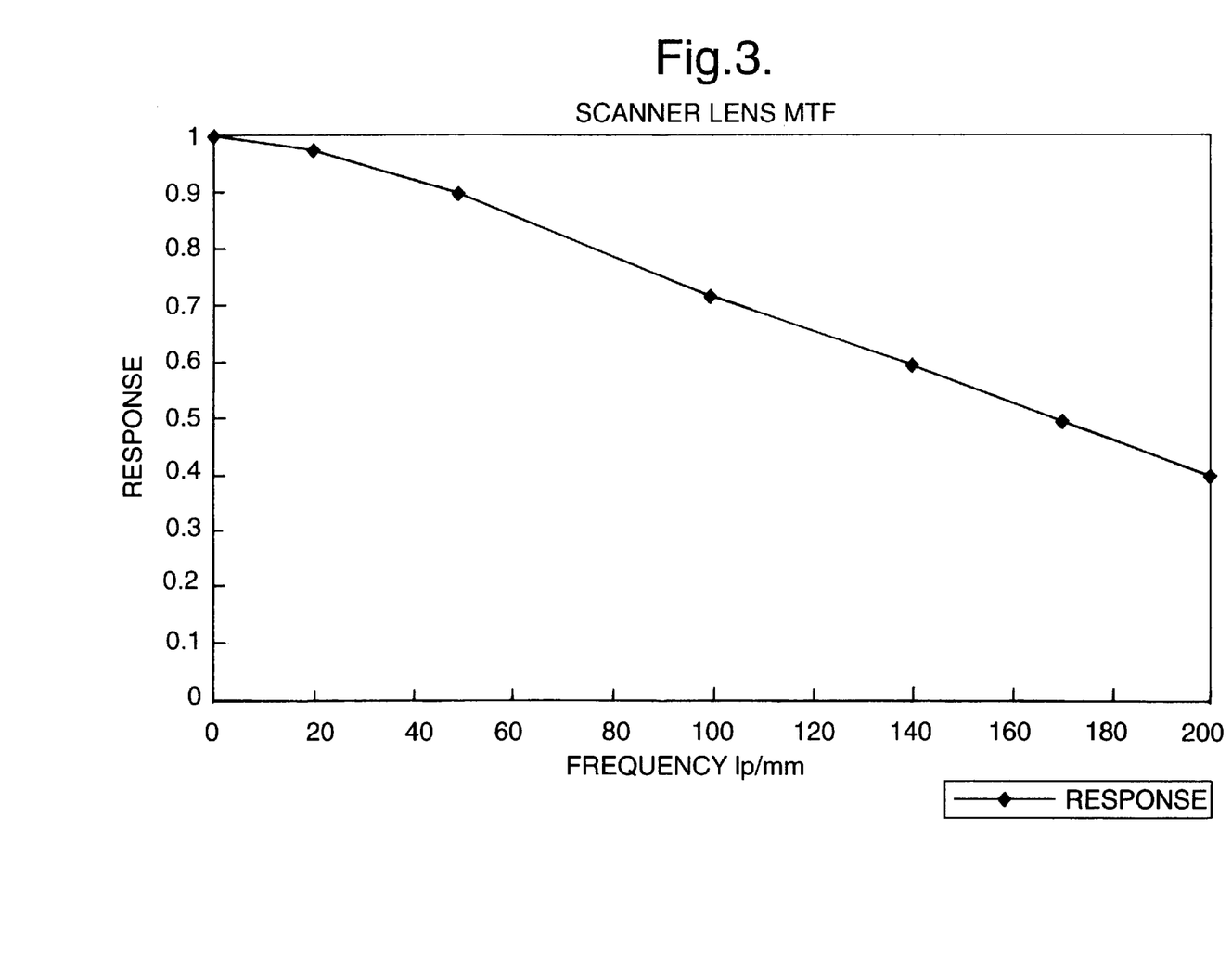
FIG. 3 illustrates a typical scanner lens MTF.
Figure 4:
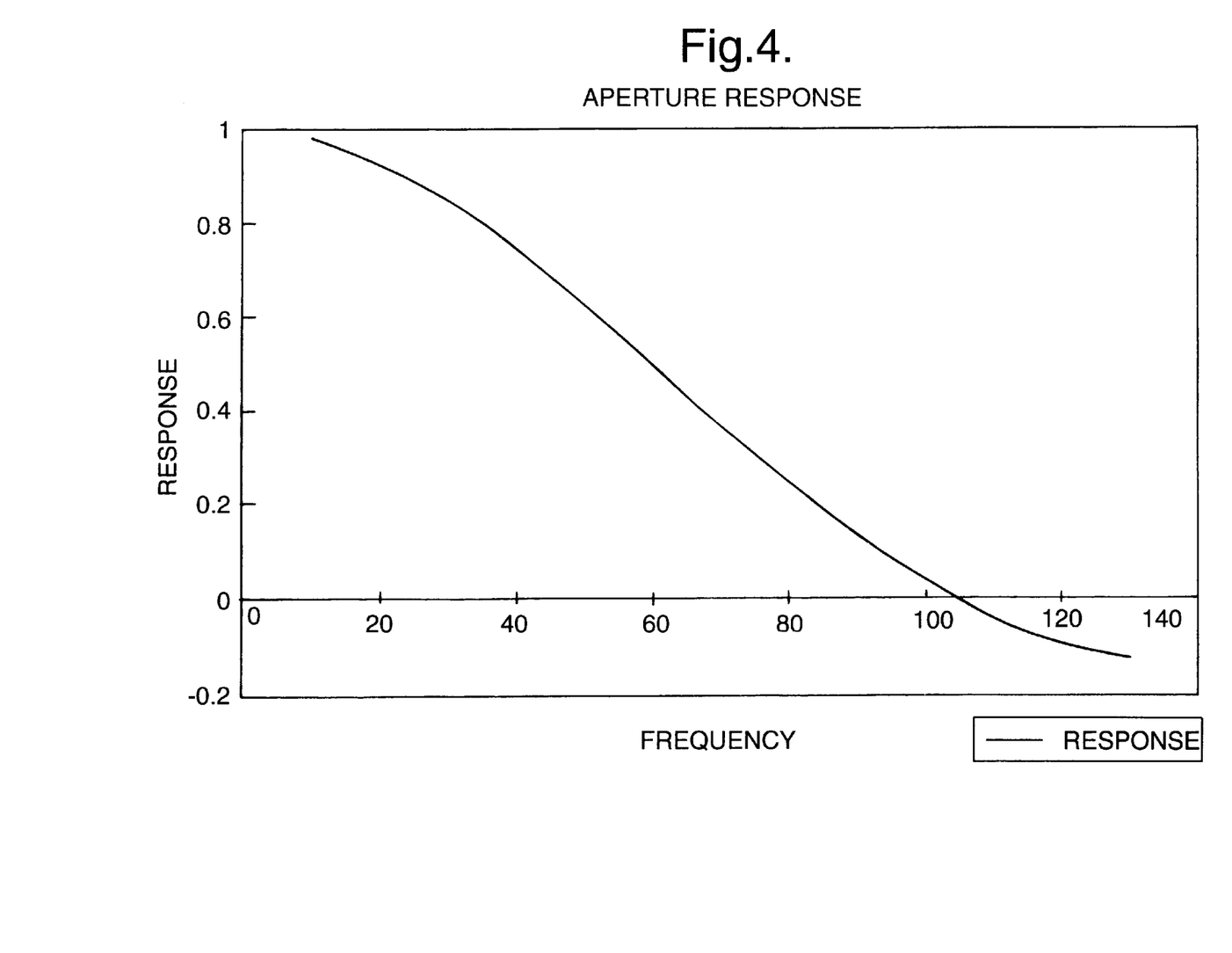
FIG. 4 illustrates a typical aperture (sample area) response MTF.

The scanner produces an electronic version of the origination but there will be defects such as colour distortion and a loss of MTF (frequency) response due to the scanner lens (FIG. 3) and scanner aperture (FIG. 4). Thus, the image produced will have a frequency spectrum which is the result of both the scanner and original.

Figure 5:
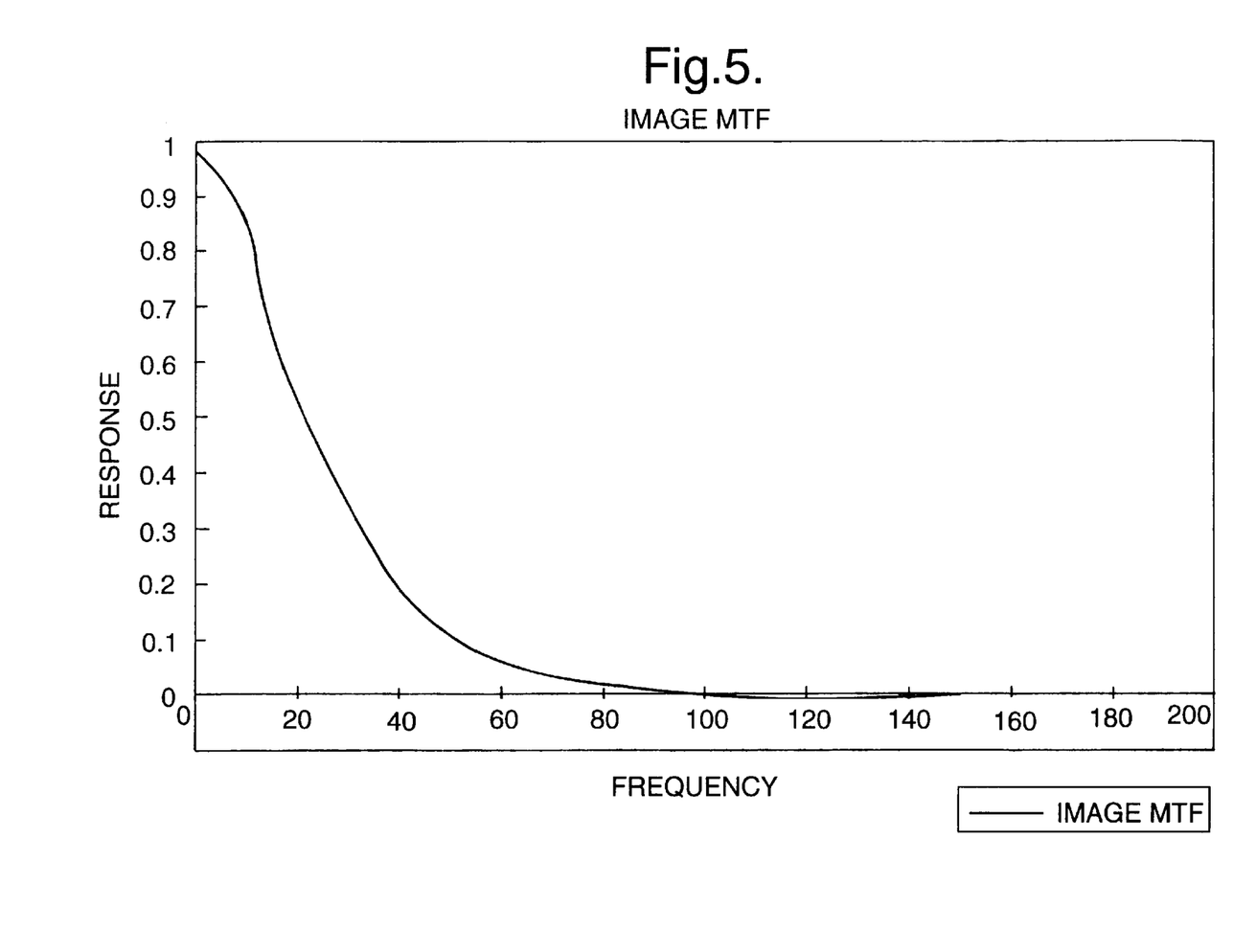
FIG. 5 illustrates a typical image MTF.

FIG. 5 illustrates an example of a final input profile resulting from a combination of two scanner profiles and transparency profile.

A complication which can arise is that typical scanners are capable of scanning at a range of resolutions, which may be spot or continuous, and the pixels so generated may be used to output at a different resolution or used to generate another set of pixels by interpolation. This process is used to generate an output which is enlarged or reduced from the original. The scans at different resolutions will generally have different MTF characteristics.

The resolution of the scanner will usually be chosen to exactly match the output size required or chosen as a spot resolution to provide sufficient information to allow an output of an appropriate size to be made at the required quality. (Resolution varies according to application, e.g. a newspaper may scan at 120–150 lines/inch measured at final size, whereas a quality output may require up to 600 lines/inch).

The scanner MTF (i.e. the combination of aperture and lens MTFs) is best thought of as a graph representing two dimensional frequency response of an input scanner to original images. It is best measured using special test originals which contain spatial frequencies in at least two orthogonal directions, and preferably in all directions of a two dimensional original. Frequencies should range from zero to five or ten times greater than the response of the scanner under test. The material of the test chart should have sufficient resolution so that it does not materially affect the measurements.

The typical maximum frequency for a transparency scanner will be around 160–200 line pairs/mm (up to 5000 line pairs/inch).

It should be noted that the scanner may operate under a variety of scanning conditions each of which may have a different MTF characteristic. The MTF appropriate for the scanning conditions will be included with the scanned image data.

The resultant profile is stored and attached as a software tag to the image file.

Once the image has been digitised, it is common to view images on a workstation colour monitor so that they can be corrected automatically and manually for desired colour and planned into a larger image, often a page. In this case, colour management will be handled as another aspect of the system and this is indicated schematically at 7 in FIG. 1. The present invention is concerned primarily with handling variations in sharpness and to that end an editing processor 8 is provided coupled to an operator controlled input device 9 such as a keyboard and/or mouse and a monitor 10.

Since the monitor 10 will usually have a lower pixel resolution than the image as stored in the image 5 and will also require a smaller image, care must be taken when modifying the image for display to ensure that the displayed version is an accurate representation of the image as it would be output on an output scanner.

The editing processor therefore generates an edit profile in a store 11 which will eventually to be used in combination with the input profile during an output process, and a view profile stored in a store 12 which is used to compensate for resizing and the frequency response of the monitor 10 during the editing process.

Thus, during an editing process, initially the input profile from the store 6 and the image data from the store 5 will be passed to the editing processor 8 which will then apply the input profile, the edit profile in the store 11, and the view profile as stored in the store 12 to the image data so that the resulting image can be viewed on the monitor 10.

The editing processor 8 initially stores as an edit profile in the store 11 a profile which compensates for loss of sharpness due to the input device and predicted loss of sharpness due to the output device as obtained from an output profile in a store 13. The output profile will have a similar form to the input profile but, of course, be characteristic of the output device.

The editing processor 8 then obtains the edit profile 11 and modifies it (either directly or by concatenation) with the view profile in the store 12, the modified profile then being used in combination with the input profile from the store 6 to modify the image data from the store 5 which is then displayed on the monitor 10. The view profile will resize the image data and compensate for the frequency response of the monitor 10.

The algorithm applied by the editing processor 8 will have the form as set out below:

$$NPS = \frac{\int (I/P\text{Profile})(USM\text{Profile})(O/P\text{Profile})\text{Sharpweight}df}{\int (\text{Eye Response})\text{Sharpweight}df}$$

where NPS is Normalised Perceived Sharpness which represents perceived sharpness on a normalised scale and is independent of the devices/materials etc.

Integration is from 0 to ∞.

f is spatial frequency.

Sharpweight is a function which limits the integration of those frequencies which are important in giving visual sharpness, typically it is unity for 0.4–10 c/mm and zero otherwise.

I/P Profile and O/P Profile are as defined above.

Figure 6:
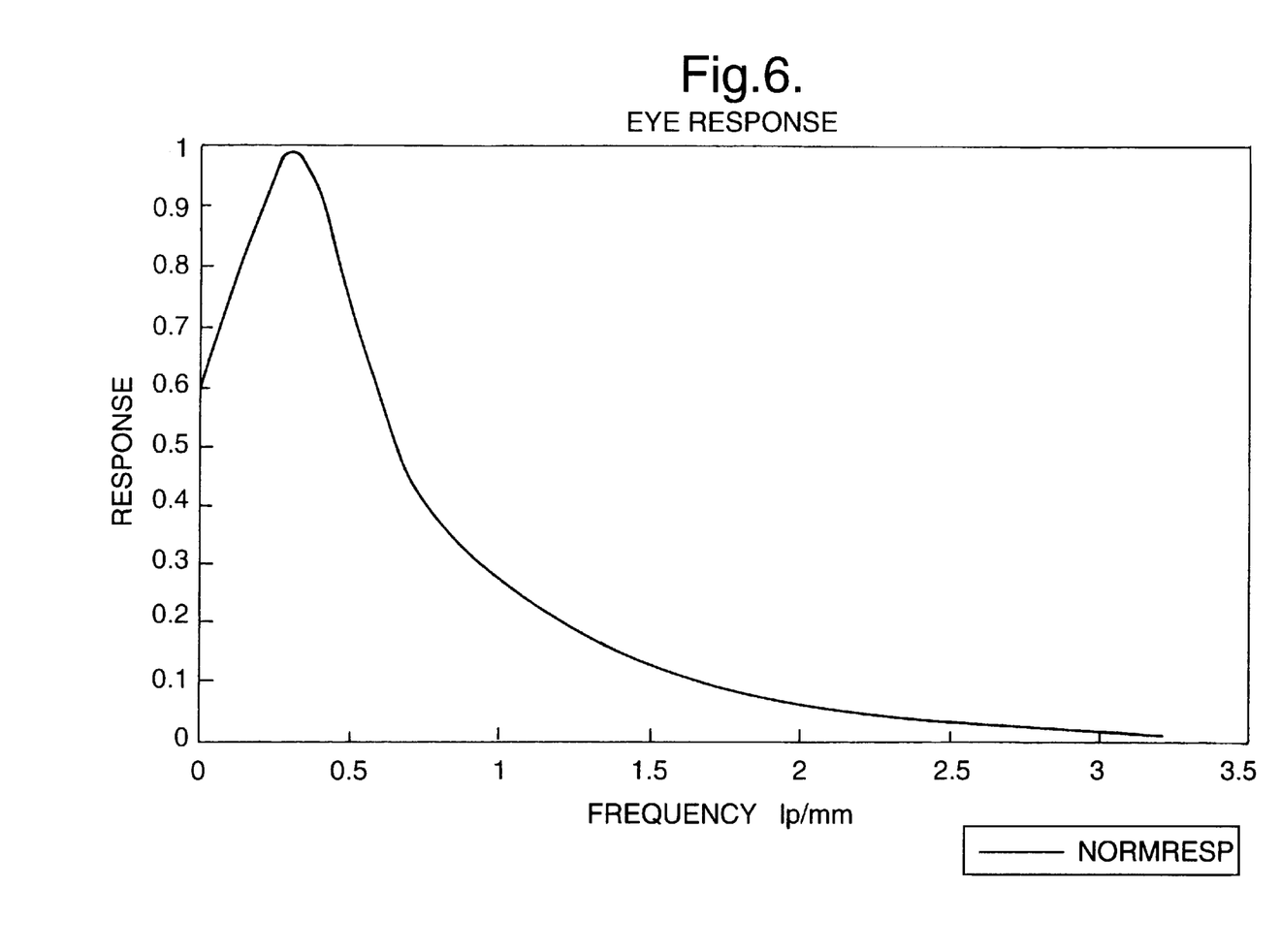
FIG. 6 illustrates a typical eye response MTF.

Eye Response is a profile defining a typical human eye response curve for threshold detection conditions and an example is shown in FIG. 6.

USM Profile (the Edit profile in this example) characterises the USM which is required to satisfy the desired NPS.

Using this algorithm, the editing processor 8 generates a USM profile which is used as the edit profile and stored in the store 11. The edit profile aims to boost frequencies which most affect sharpness and hence are at the lower end of the sharpweight function. This is determined by the eye response weighting. Note that in FIG. 6 the scale is changed from frequency at original to frequency at print.

Figure 7:
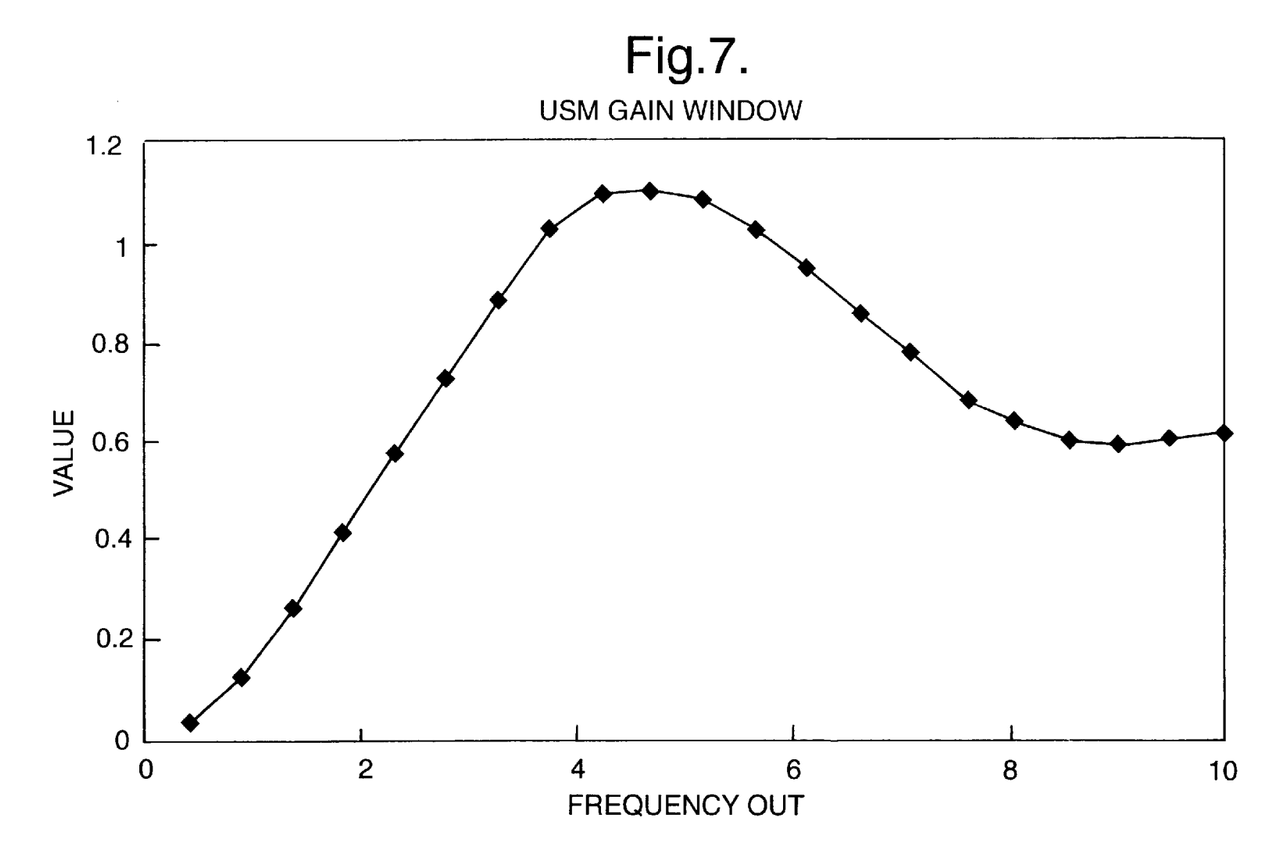
FIG. 7 illustrates an edit profile.

An example of an edit profile is shown in FIG. 7. A profile of this shape is scaled in amplitude and applied with the other profiles such that the NPS achieves a desired value. This value is found by assessing images to give a standard sharpness value.

Once the operator is satisfied with the appearance of the image as shown on the monitor 10, the original image data in the store 5 (or in a workstation store (not shown)) is fed to an output device 14 along with the input profile in the store 6 and the edit profile in the store 11. The output device includes an output processor 15 which combines the three profiles together, for example by concatenating them, and also modifies the image data from the store 5 with colour management modification instructions. The modified image data is then further modified by the concatenated profiles and the resultant image data is fed to an output scanner 16 which controls the exposure of a record medium 17 on a drum 18 or other recording device. The resultant image recorded on the record medium 17 will then be fully compensated for frequency degradation due to the different frequency responses of the processes involved and will also be further enhanced as required by the operator.

It will be understood that the input device 1 and output device 14 along with the editing stage do not need to be proprietary devices. Furthermore, the three devices do not need to be permanently connected together. Thus, the image store 5 and input profile store 6 could be located on a floppy disc or the like which is physically transferred from the input device 1 to the editing processor. Similarly, the store 11 could be separate from both the input device and the output device.

We claim:

1. A method of generating a digital representation of an image, the method comprising scanning the image to generate digital data defining the colour content of pixels of said image; and generating an input profile defining a MTF of a scanning process, wherein said input profile is defined by a combination of an origination profile representing the MTF of an origination process which generated said image, and a scanner profile representing the MTF of a scanner input device used in the scanning process.

2. A method according to claim 1, further comprising storing said data defining said image, and storing data defining said input profile.

3. A method according to claim 2, wherein both data are stored in a common store.

4. A method according to claim 2, wherein the location of said data defining said input profile is identified with said data defining the image.

5. A method of editing a digital representation of an image defined by digital data defining the colour content of pixels of the image generated by scanning the image to generate digital data defining the colour content of pixels of said image, and an input profile defining a MTF of the scanning process, the method comprising generating an editing profile which, when applied to said digital representation of the image in combination with said input profile, will impart a desired degree of sharpening to the image.

6. A method according to claim 5, wherein said editing profile is defined to take account of a colour modification process which is to be performed on the digital data representing the image.

7. A method according to claim 5, further comprising viewing a result of applying said input and editing profiles to said image on an editing output device.

8. A method according to claim 7, wherein said viewing step comprises generating and displaying a resized version of the image, after modification by said input profile and said editing profile, by applying a view profile, said view profile compensating for the MTF due to the resizing process and for the MTF of the editing output device.

9. A method according to claim 8, wherein said view profile is obtained by combining a resizing profile representing the MTF of said resizing process, and an editing output device profile representing the MTF of said editing output device.

10. A method according to claim 5, wherein said editing profile is determined also to take account of an output profile representing the MTF of an output process in which the image is output onto a record medium.

11. A method according to claim 10, wherein said output profile is defined as a combination of an output device profile representing the MTF of an output device and a record medium profile representing the frequency response of the record medium.

12. A method according to claim 5, wherein said editing profile is determined also to take account of an eye response profile defining a typical human eye response curve for threshold detection conditions.

13. A method according to claim 12, wherein the editing profile is a USM Profile and is determined in accordance with the following formula:

$$NPS = \frac{\int (1/P\text{Profile})(USMP\text{Profile})(O/P\text{Profile})\text{Sharpweight} df}{\int (\text{Eye Response})\text{Sharpweight} df}$$

where NPS is a Normalised Perceived Sharpness which represents perceived sharpness on a normalised scale and is independent of the devices/materials etc.

Integration is from 0 to ∞, f is spatial frequency,

Sharpweight is a function which limits the integration of those frequencies which are important in giving visual sharpness, I/P Profile and O/P Profile are input and output device profiles respectively, and Eye Response is a profile defining a typical human eye response curve for threshold detection conditions.

14. Apparatus for editing a digital representation of an image defined by digital data defining the colour content of pixels of the image and an input profile defining the MTF of a scanning process during which the digital representation is generated, the apparatus comprising a processor for generating an editing profile which, when applied to the digital representation of the image in combination with said input profile, will impart a desired degree of sharpening to the image.

15. Apparatus according to claim 14, the apparatus further comprising an editing output device on which the result of applying the editing profile can be viewed.

16. Apparatus according to claim 14, wherein said processor generates said editing profile so as to take account of an output profile representing the MTF of an output process in which the image is output onto a record medium.

17. Apparatus according to claim 14, further comprising an output device to which said digital representation of the image and said input and editing profiles are supplied, separately or in combination, said output device including control means which responds to said supplied profiles and said digital data to generate a representation of the image on a record medium.

18. Apparatus according to claim 14, wherein said processor generates a resized version of the image for display on said output device by applying a view profile, said view profile compensating for the MTF due to said resizing process and for the MTF of said editing output device.

19. Apparatus according to claim 18, wherein said processor generates the view profile by combining a resizing profile representing the MTF of the resizing process, and an editing output device profile representing the MTF of said editing output device.

20. Apparatus according to claim 14, wherein said processor generates said editing profile so as to take account of an eye response profile defining a typical human eye response curve for threshold detection conditions.

21. Apparatus according to claim 20, wherein said processor generates said editing profile in accordance with the following formula:

$$NPS = \frac{\int (1/P\text{Profile})(USMP\text{Profile})(O/P\text{Profile})\text{Sharpweight} df}{\int (\text{Eye Response})\text{Sharpweight} df}$$

where NPS is Normalised Perceived Sharpness which represents perceived sharpness on a normalised scale and is independent of the devices/materials etc., Integration is from 0 to ∞, f is spatial frequency, Sharpweight is a function which limits the integration of those frequencies which are important in giving visual sharpness, I/P Profile and O/P Profile are input and output device profiles respectively, and Eye Response is a profile defining a typical human eye response curve for threshold detection conditions.

\* \* \* \* \*